July 1, 1930.  G. JOHNSON  1,769,695
SNAP FASTENER
Filed Oct. 2, 1929
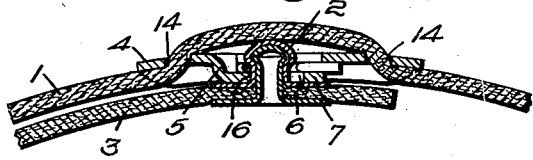
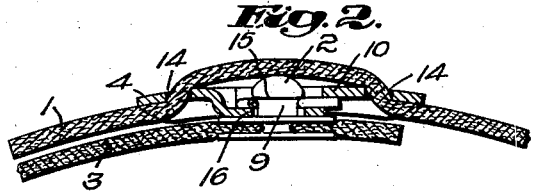
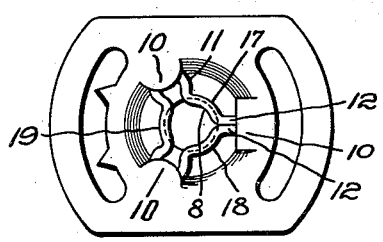
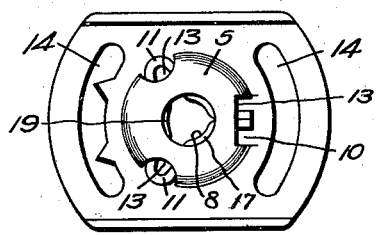
Inventor:
Gustav Johnson,
by Emery, Booth, Varney & Townsend
Attys Patented July 1, 1930

1,769,695

UNITED STATES PATENT OFFICE

GUSTAV JOHNSON, OF WEST ROXBURY, MASSACHUSETTS, ASSIGNOR TO UNITED-CARR FASTENER CORPORATION, OF CAMBRIDGE, MASSACHUSETTS, A CORPORATION OF MASSACHUSETTS

SNAP FASTENER

Application filed October 2, 1929. Serial No. 396,670.

My invention aims to provide improvements in snap fasteners particularly, though not exclusively, for use on gloves, overshoes or the like.

In the drawings, which illustrate a preferred embodiment of my invention:—

Figure 1 is a longitudinal section taken through the entire fastener installation and showing the relation of stud and socket when placed under lateral stress;

Fig. 2 is a section similar to Fig. 1, but showing the relation of the fastener members when not under lateral stress, the stud being shown in elevation; and Figs. 3 and 4 show plan views of opposite faces of the socket member of the fastener.

Referring to the particular embodiment of my invention illustrated by the drawings, I have shown a fastener socket slidably attached to a strap 1 and a cooperating stud 2 secured in fixed relation to a suitable carrying medium 3.

The socket has a plate part 4 pressed from sheet metal and provided with a dish-shaped portion 5 in the central portion thereof. A stud-receiving aperture 6 is provided in the bottom of the dish-shaped portion. The bottom of the dish-shaped portion forms a ledge 7 around the aperture upon which rests a wire spring. This spring has a generally circular central portion 8 intersecting the stud-receiving aperture (Figs. 3 and 4) to provide yieldable means for engagement with the neck 9 of the stud 2 when the stud and socket are engaged, as shown in Figs. 1 and 2.

The spring is held in place within the dish-shaped portion by a number of ears 10 pressed from the dish-shaped portion and bent to lie in the same plane as the rest of the plate part 4. These ears 10 extend over laterally projecting portions of the spring, as best illustrated in Figs. 2 and 3.

The number of ears 10 and projections on the spring is not material, but for the purposes of illustration I have illustrated these as three in number. Two of the lateral projections from the central portion 8 of the spring are in the form of loops 11—11 (Figs. 3 and 4) and the third is formed by the parallel ends 12—12 of the wire.

In assembling the spring with the plate part 4, the ears 10, which normally extend at right angles to the plane of the plate part 4, are bent downwardly and inwardly over the projections of the spring which is first placed in the dish-shaped portion 5 with the projections located in the openings 13. The openings 13 are formed by pressing out the material for the ears 10. When the spring is thus assembled it cannot shift to any substantial extent because the loops 11—11 engage the walls about the openings 13 and prevent lateral movement, as clearly indicated by Figs. 3 and 4.

The plate part 4 is provided with strap-receiving slots 14—14 at opposite sides of the dish-shaped portion whereby the socket may be secured to a strap in a well known manner.

During engagement and disengagement of the stud and socket the head passes through the stud-engaging portion 8 of the spring by forcing the jaw portions 17 and 18 laterally without any appreciable lateral movement of the jaw 19. This is due to the fact that the loops 11—11 hold the jaw 19 substantially rigid while the ends 12—12 are free to move laterally in their openings 13, as shown in Fig. 4.

The shoulder 15 on the stud is relatively abrupt and the neck 9 is relatively straight. Therefore, when the fastener elements are placed under lateral stresses, as they usually are when used on overshoes, gloves and the like, the shoulder 15 will resist separation of the fastener. The stud and socket will shift relative to each other until the neck engages the wall 16 surrounding the stud-receiving aperture 6 (Fig. 1), thereby preventing deformity of the stud-engaging portion 8 of the spring. During this lateral shifting of the fastener elements the jaw 19 will yield slightly, but it is to prevent setting and distortion of this jaw that the wall 16 is engaged by the neck 9 of the stud.

While I have illustrated and described a specific embodiment of my invention, I do not wish to be limited thereto, as the scope of my invention is best defined in the following claims.

Claims:

1. A socket comprising, in combination, a plate having a dish-shaped portion provided with a stud-receiving aperture in the bottom thereof, a spring located in said dish-shaped portion, said spring having a number of jaws intersecting said aperture, said spring also having a number of lateral projections fitted into openings in the side wall of the dish-shaped portion to fix the spring in a predetermined relation to the plate and ears formed integral with said plate and spaced from the bottom of the dish-shaped portion, said ears extending over the laterally projecting portions of the spring to maintain assembly with the plate.

2. A socket comprising, in combination, a plate having a dish-shaped portion provided with a stud-receiving aperture in the bottom thereof, a spring located in said dish-shaped portion, said spring having a number of jaws intersecting said aperture, said spring also having a number of lateral projections fitted into openings in the side wall of the dish-shaped portion to fix the spring in a predetermined relation to the plate and ears formed integral with said plate and spaced from the bottom of the dish-shaped portion, said ears extending over the laterally projecting portions of the spring to maintain assembly with the plate, said ears being formed of the material pressed from the dish-shaped portion to provide the openings in the side wall and some of said projections engaging the walls surrounding the said openings to hold one jaw relatively rigid while the other projections fit loosely in their openings to permit free movement of the other jaws.

3. A separable fastener installation comprising, in combination, a socket having a plate part slidably secured to a strap and having a dish-shaped portion provided with a stud-receiving aperture in the bottom thereof, a spring secured to said plate part adjacent to the stud-receiving aperture, said spring having a relatively rigid jaw and a number of relatively yieldable jaws intersecting said aperture and having projections fitting into apertures in the side wall of said dish-shaped portion to hold the spring in a predetermined relation to the plate portion, a cooperating stud secured to a support and having a head, a neck, and a shoulder between the head and neck, said head adapted to pass between the jaws of the spring to permit engagement of the jaws with the neck of the stud and a wall surrounding said stud-receiving aperture and adapted to be engaged by said neck when said stud and socket are placed under lateral stresses thereby to prevent distortion or setting of the relatively rigid jaw.

4. A socket for attachment to a strap or the like comprising a plate part 4 having a central dish-shaped portion 5 having a stud-receiving aperture 6 in the bottom thereof, a spring located in said dish-shaped portion and having annularly arranged jaws 17, 18 and 19 intersecting said aperture 6 and lateral projections 11 and 12, a number of ears 10 pressed from the dish-shaped portion and extending over the projections of the spring to hold it in the dish-shaped portion, and means 14—14 provided by the plate for engagement of the socket with a strap or the like.

In testimony whereof, I have signed my name to this specification.

GUSTAV JOHNSON.